United States Patent
Tulyani

(10) Patent No.: US 7,428,622 B2
(45) Date of Patent: Sep. 23, 2008

(54) MANAGING DISK STORAGE MEDIA BASED ON ACCESS PATTERNS

(76) Inventor: Akhil Tulyani, 728 Golden Ave., Secaucus, NJ (US) 07094

( * ) Notice: Subject to any disclaimer, the term of this patent is extended or adjusted under 35 U.S.C. 154(b) by 0 days.

(21) Appl. No.: 11/239,634

(22) Filed: Sep. 28, 2005

(65) Prior Publication Data

US 2006/0069886 A1 Mar. 30, 2006

Related U.S. Application Data

(60) Provisional application No. 60/614,107, filed on Sep. 28, 2004.

(51) Int. Cl.
*G06F 12/16* (2006.01)
*G06F 12/00* (2006.01)

(52) U.S. Cl. .................. 711/161; 711/114; 711/162

(58) Field of Classification Search .......... 711/161, 711/162, 114
See application file for complete search history.

(56) References Cited

U.S. PATENT DOCUMENTS

| | | | | |
|---|---|---|---|---|
| 5,900,007 A | * | 5/1999 | Nunnelley et al. | ............. 711/4 |
| 7,065,611 B2 | * | 6/2006 | Kano | .......................... 711/114 |
| 2005/0268065 A1 | * | 12/2005 | Awada et al. | ................ 711/173 |

* cited by examiner

*Primary Examiner*—Hyung Sough
*Assistant Examiner*—Mardochee Chery
(74) *Attorney, Agent, or Firm*—Mintz, Levin, Cohn, Ferris, Glovsky and Popeo, P.C.; Michael D. Van Loy; James P. Cleary

(57) ABSTRACT

Systems and methods for managing the distribution of data on a pool of storage media are disclosed. The data are managed based on access patterns, storage media activity, and/or health parameters. An access pattern of one or more units of data in a pool of two or more storage media is determined. At least a portion of the one or more units of data are migrated from one storage medium to another storage medium within the pool of two or more storage media based on the access pattern.

13 Claims, 12 Drawing Sheets

MANAGING DISK STORAGE MEDIA BASED ON ACCESS PATTERNS

CROSS REFERENCE TO RELATED APPLICATIONS

The present application claims priority under 35 U.S.C. §119 to U.S. Provisional Application Ser. No. 60/614,107, filed Sep. 28, 2004, entitled MANAGING DISK STORAGE MEDIA, the disclosure of which is incorporated herein by reference.

BACKGROUND

Electronic data is continuously being generated and stored in some kind of medium. Stored data can be exposed to a full spectrum of different access patterns, which in many cases are dependent on data type. Some types of data have a short life or persistency, or require to be accessed quickly. Other types of data may have a period of frequent access in their early stages, but become less needed over time. As data "ages" it usually becomes accessed less frequently. Some data may eventually get purged, while others may get archived for long-term storage.

Data storage and access patterns are also based on cost. To handle the various types of accesses to data in their respective lifecycle in a cost effective manner, a plethora of storage devices are used. Many of these storage devices use some kind of storage disk, referred to as a "hard disk," which is a disk of plastic or metal material having an electromagnetically charged surface or set of surfaces on which large amounts of data can be stored and read from. Data having continuous access patterns and requiring fast bandwidth will most likely reside in fast-access disks, such as fast Small Computer Systems Interface (SCSI) disks or disk arrays. Data needing to be accessed much less frequently may reside in slower-access disks, such as Serial Advanced Technology Attachment (SATA) disk arrays. Data for long-term archival is usually stored on serialized tape. Data requiring portability is typically stored in removable media such as Compact Disk-Read Only Memory (CD-ROM), Digital Video Disk (DVD) ROMs, removable hard disk platters, and portable hard drives.

Migrating data to a lower performance but lower cost storage medium is primarily based on the relative "value" of that data, i.e. a price that can be associated with the data based on its economic, social, or functional importance or desirability, and as compared with all other similar or similarly available data. As the value of the data decreases, storage costs can be decreased by having less-valued data hosted on less costly storage media. Even if the value of data does not decrease over time, the amount of data generated over time can be burdensome, thus also requiring a lower cost storage medium.

Each specific type of storage device has advantages and disadvantages. Most storage devices that employ hard disks (or simply called "disks"), such as a Redundant Array of Independent Disks (RAID) device or other type of disk "pool," provide high data reliability, fast random access to data, high data throughput, and very low latency. Disks are typically of rugged construction and can tolerate diverse environments. However, disks have a number of disadvantages, among which is a limited life governed by the operating environment of such factors as heat, vibration, disk activity such as power-on hours, and the number of spin ups. Disks are also relatively expensive compared to other media, generate significant heat, and consume a relatively large amount of power.

Disks are always kept spinning, or "spun up," to ensure quick access to data. Thus, disks are typically active while the associated access system is active. Some access systems will spin a disk up if the data on the disk is accessed, and use an inactivity timeout to spin the disk down. As a result, the operational state of a disk is directly affected by the access pattern or activity of its content. In other words, any given disk may only be as active as the access pattern of the most-accessed data stored on it. Thus, a disk that contains a unit of data that is continuously accessed cannot be spun down.

Tapes are inexpensive but can hold very large amounts of data for long periods of time. However, data stored on tapes can only be accessed in a sequential manner, resulting in very slow access speeds and high latency. CD-ROMs and DVDs are very inexpensive but can only hold limited data. They also are known to have short data retention periods if the quality of the disks is poor. Most CD/DVD disks are write-once, or allow only limited write cycles. Portable media, like CD-ROMs, DVDs, and removable hard disks, require significant manual intervention to secure data, identify content, and integrate to and from enterprise storage systems.

What is needed is a storage device having the properties of high speed, high reliability, low cost, low heat generation, low power consumption, and long-term data archiving.

SUMMARY

This document discloses systems and methods that manage the distribution of data on a pool of storage media based on access patterns, storage media activity, and/or health parameters. In accordance with one aspect, a method of managing storage media includes determining an access pattern of one or more units of data in a pool of two or more storage media. The method further includes migrating at least a portion of the one or more units of data from one storage medium to another storage medium within the pool of two or more storage media based on the access pattern.

In accordance with various aspects of these systems and methods, the access pattern includes a number of times within a time frame a unit of data is accessed from at least one storage medium. In another aspect, each storage medium includes a data storage disk. In yet another aspect, the method described above can be implemented on a computer readable medium or propagated signal providing a computer program configured to cause a processor to implement the above described storage media management technique.

In another aspect, a system is disclosed for managing storage media. The system includes one or more storage classes. The storage classes include two or more storage media of the same storage class. The system further includes a presenter configured to generate and present a common namespace related to data stored on at least one storage medium to a user, and a collector configured to gather statistics on the two or more storage media based on the common namespace. The system further includes an executer having a migration module configured to migrate data among the two or more storage media based on the statistics.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
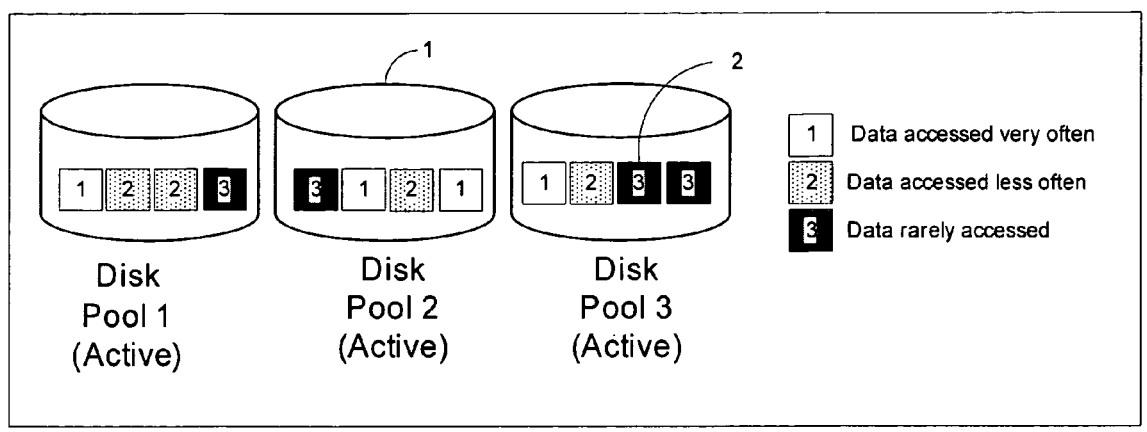
FIGS. 1-11 illustrate various methods and techniques for dynamically migrating data to improve performance of a disk pool.

This document discloses systems and methods that manage the distribution of data on a disk pool based on access patterns, to allow data to be hosted on the disks for the data's entire life cycle. A system or method can be embodied in software code or a propagated signal that includes instructions for managing power consumption to control and minimize the amount of heat generated by the disks and to increase disk life. These systems and methods extend mean time between failures (MTBF), which is a function of disk usage and operating temperature.

In accordance with an exemplary embodiment, a system and method are provided by which a disk pool dynamically adjusts itself to the access patterns of the data stored on two or more disks. The system can be configured to meet performance requirements cost-effectively and reliably, and host data both for short term access as well as long term archiving on a single storage medium. A unit of data can represent a video file, an audio file, a text or other character file, a set of machine readable instructions, or portions thereof.

The system and methods described herein also allow breakaway disks, such as Universal Serial Bus (USB) or Firewire compliant disk drives, to be used for physical distribution of data. By marginalizing the shortcomings of disks, a storage medium is provided that has all the combined advantages of all the storage devices, without their respective combined disadvantages.

In general embodiments a namespace is associated with a storage device (or user or access system thereof) that uniquely and unambiguously identifies a set of names for objects or files having different origins but similar names. This namespace is under the control of the user, and changes to the namespace can be made only by the user. This namespace is kept constant even though files can be physically hosted on separate storage devices and thus have a different underlying namespace.

The health of each disk in the disk pool is constantly monitored and determined so that data can be preserved even in the event of a device failure, improving data reliability and archive life. Information that is maintained and tracked in the monitoring includes an identification of which files reside on which disk storage pool. This allows data to be migrated from a disk that is unhealthy to a disk that is healthier.

Data activity (i.e. access pattern or access frequency of the data) of each disk is also monitored, and data of similar activity is migrated to one or more disks having a unified activity, from less active or more active disks. The level of disk activity is dynamically determined and is based on the frequency with which the disks in the pool are awakened from their "sleepy state." Disks with active data spin continuously while disks with inactive data are put to sleep, thus lowering power consumption and heat generation, and increasing disk life. Accordingly, a system and method are provided where any given disk works only when required.

Disk temperatures are continuously monitored, and active disks are strategically scattered among inactive disks in the disk pool to reduce temperature hot spots and to reduce overall ambient temperature to increasing disk life. Data can be migrated to portable storage devices, known as "breakaway storage" such as USB/Firewire disks. Data on breakaway storage is secured via encryption. Content of the breakaway storage is catalogued into a metadata file residing on the breakaway storage for easy reference and automatic recognition.

In the general embodiments, a system and method includes controlling a storage medium including a pool of two or more disks so that the medium as a whole can exhibit the properties of fast random access to data, high data reliability, high data throughput, low latency, high storage density, low cost, less sensitivity to environmental conditions, long term storage, low power consumption, and low heat generation.

Figure 2:
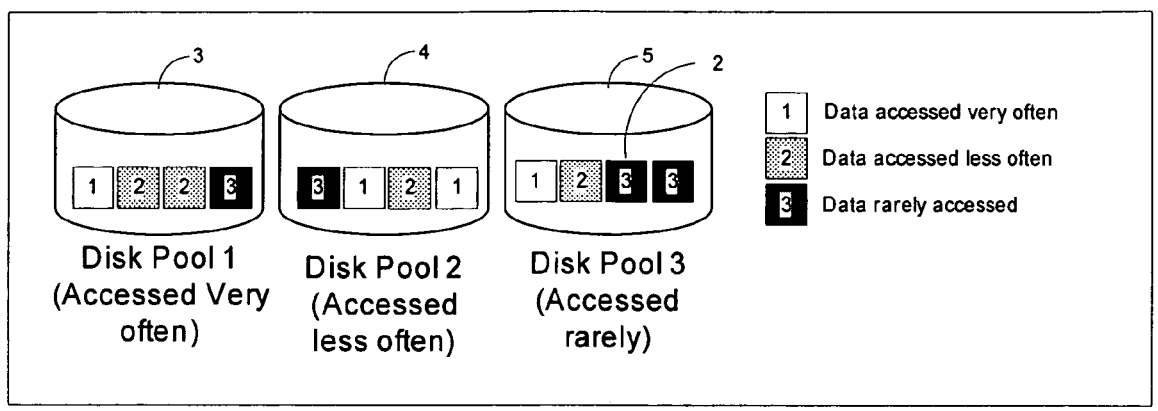
Figure 3:
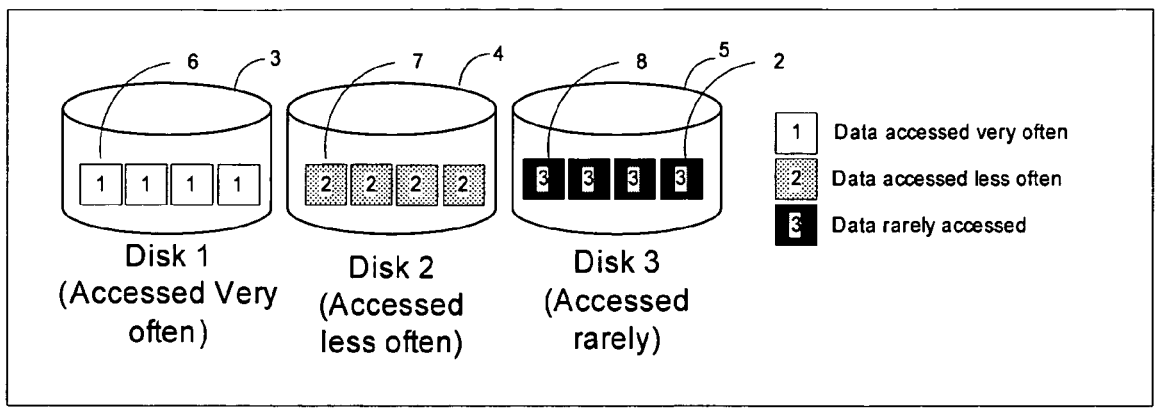

With reference to FIG. 1, access patterns of the data 2 residing on every disk or disk pool 1 are analyzed. The access patterns take into account the number of times a unit of data is accessed, and the time between each such access. The size of data of each common access pattern is determined, and one or more disks or disk pools 3, 4, or 5, with a combined capacity equal to or greater than the size of data of that common access pattern, is designated to hold that data, as shown in FIG. 2. Data 6, 7, 8 of the common access pattern is migrated from original locations to the newly created disk sub pools 3, 4, 5 as sown in FIG. 3.

While the data is physically relocated, a user perceives the data in the same user namespace. This is achieved by using headers that are maintained as placeholders in the user's namespace. When a request for a certain file is received from the user, the file is looked up. When a header is found, it is determined whether the file has actually been migrated. The header holds meta-data that helps determine the actual physical location of a file. The file can be physically in a different file system on a sleepy disk or possibly on a backend storage medium such as tape. The file is retrieved to satisfy the user request.

Figure 4:
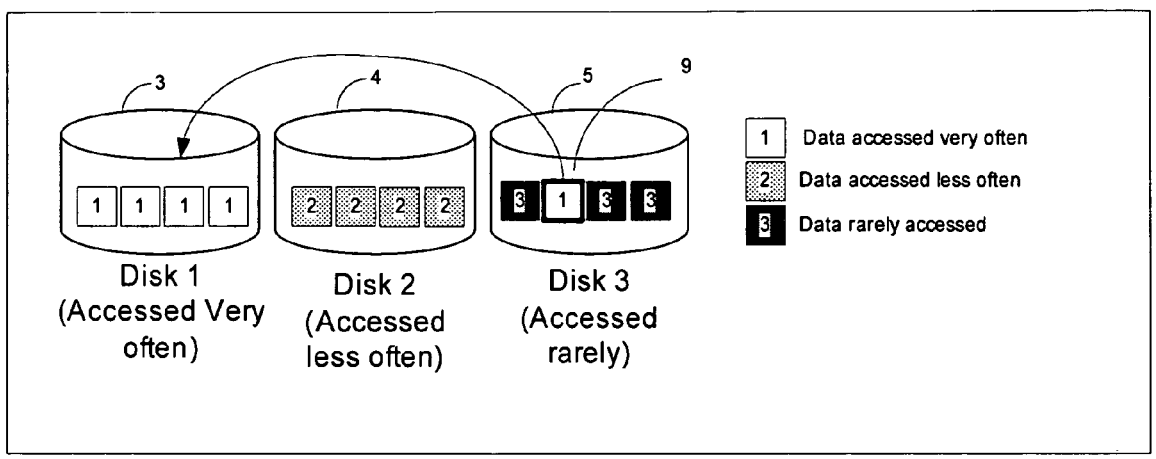

The access patterns of disk content is continuously monitored. If the access pattern of a piece of data 9 changes, the data is migrated from its current disk pool 5 to another disk pool 3 that contains data of a similar access pattern, as shown in FIG. 4.

Figure 5:
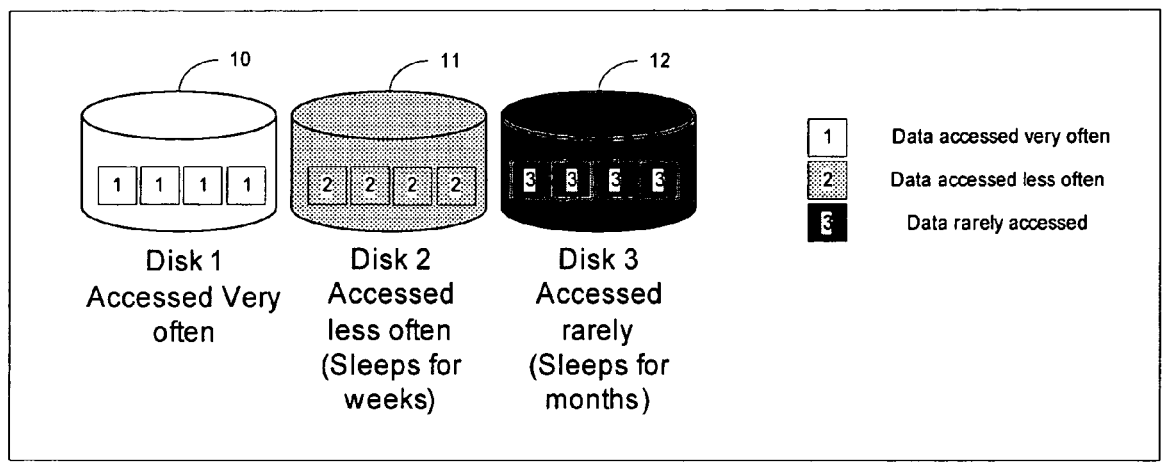

Disks or disk pools 11, 12, having data that is accessed less frequently, are put to sleep if data is not accessed for more than a specific or threshold amount of time, as shown in FIG. 5. As a disk's life is governed by its MTBF and the number of spin ups, the disk's life is optimized by keeping the disk well within operating parameters. Disks that are put to sleep will have extended life and therefore become much more suitable for long-term data archival. Accordingly, data is migrated among two or more disks based on accessed patterns in order to maximize each disk's "sleep time" and to minimize access time.

Figure 6:
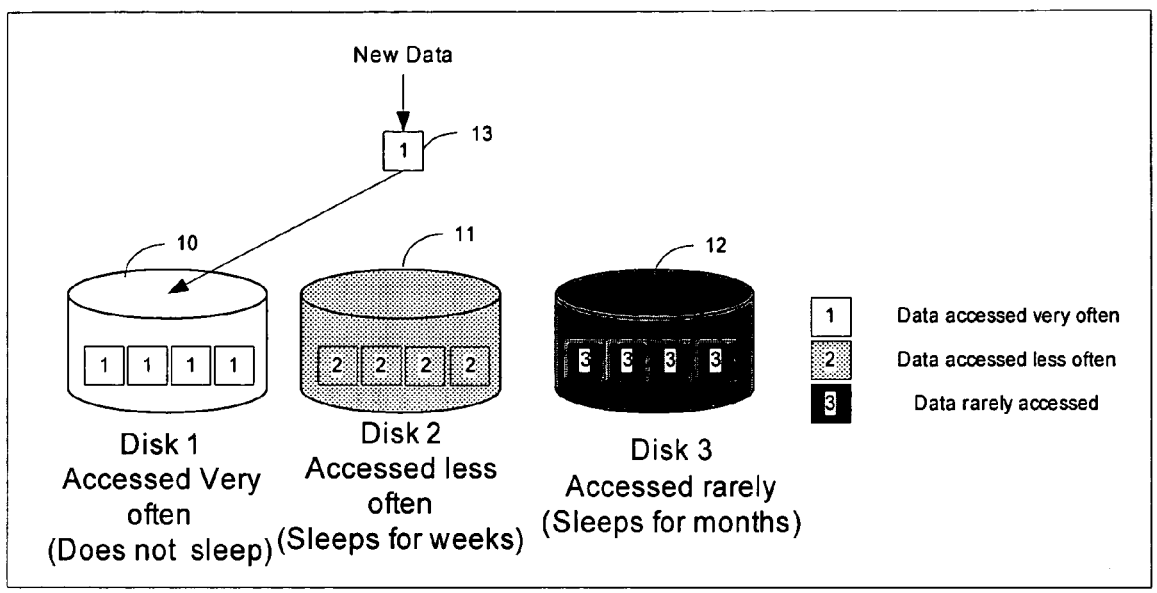

New data 13 is stored in active storage pools 10 so that currently sleeping storage pools 11, 12 are not disturbed, as shown in FIG. 6. Data that has a new, yet unpredictable access pattern will be migrated to an active disk until a repeatable pattern or extended period of inactivity is determined.

Figure 7:
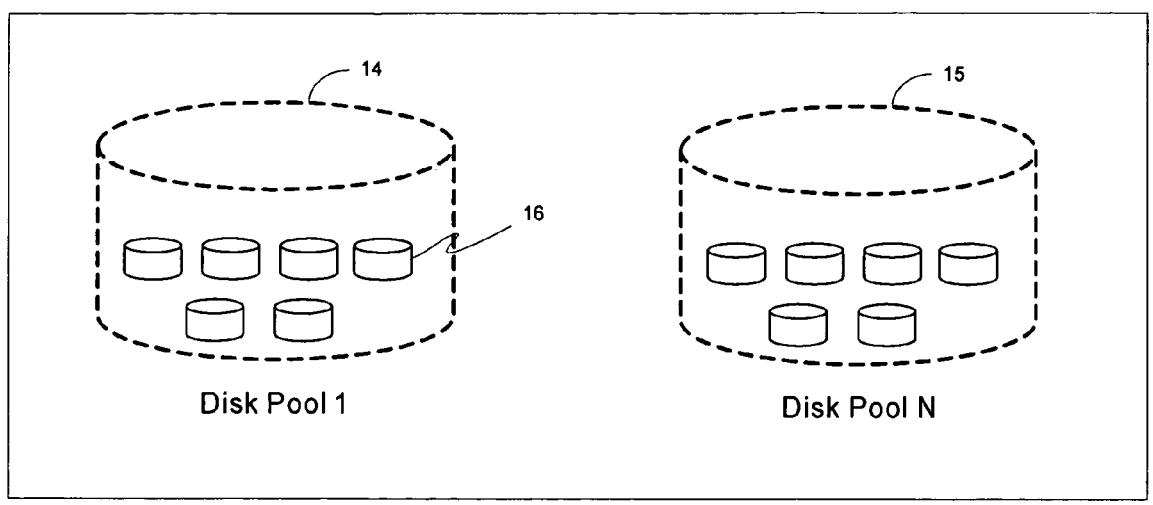
Figure 8:
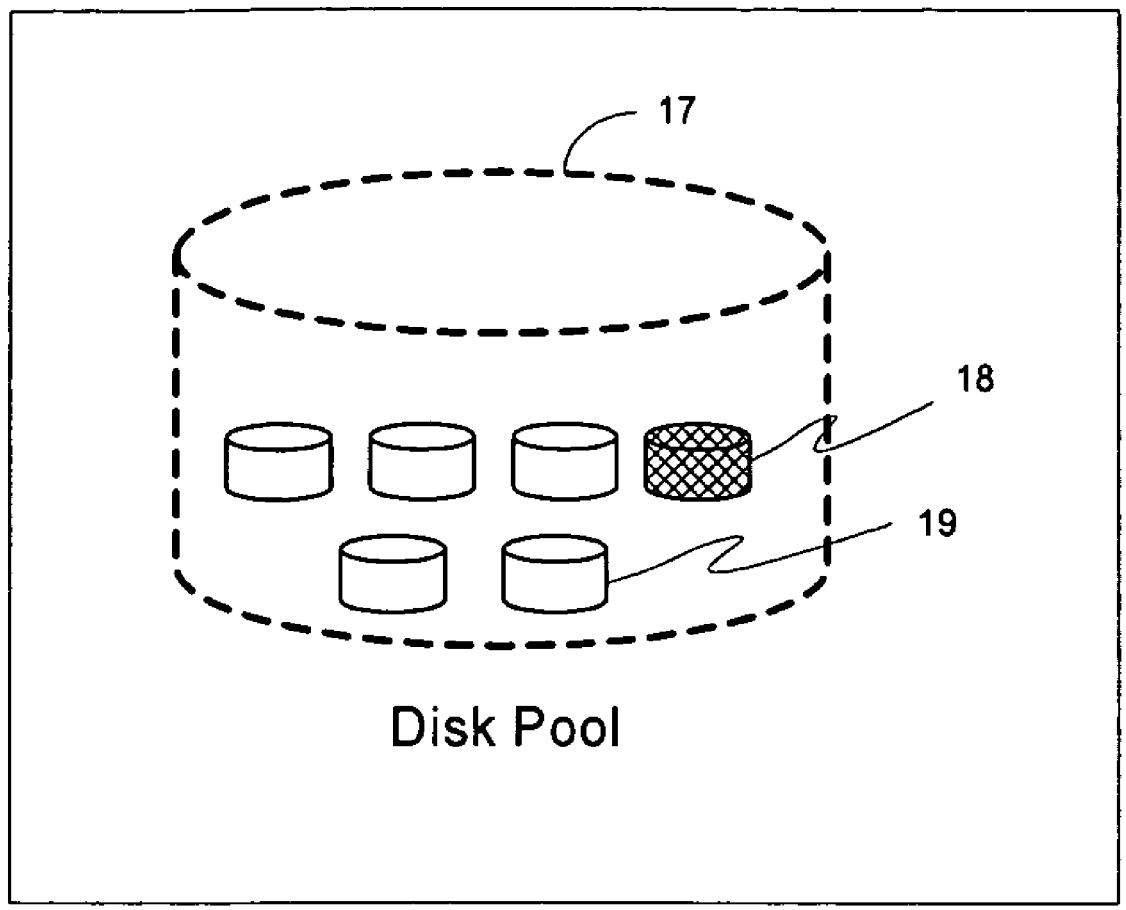

The operational parameters of each disk is analyzed in order to predict when a disk or pool of disks will fail, and to increase reliability. The life expectancy of every disk 16 in every disk pool 14, 15 is thus dynamically calculated, as shown in FIG. 7. If one or more disks 18 in a disk pool have a life that is calculated to be less than an acceptable time, all data from the failing disks 18 or disk pools is migrated to disks 19 or disk pools with a longer calculated life, as shown in FIG. 8.

After detecting a failing disk in a disk pool, a notification of the potential problem is generated. The notification can report information to a system administrator that the data is being migrated, and provide a recommendation that the disk be replaced after the migration is complete. Accordingly, in general embodiments a system and method provides reporting information for system administration and control.

Figure 9:
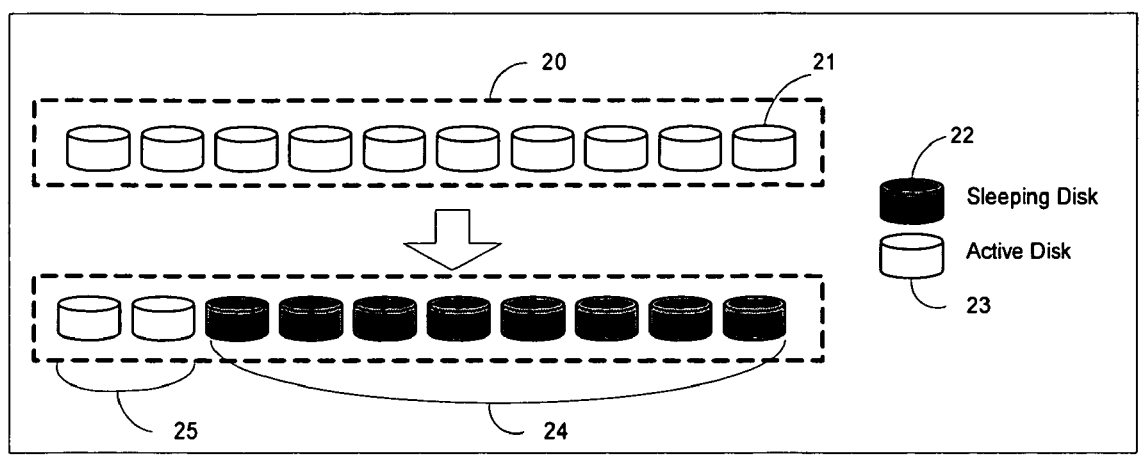

As shown in FIG. 9, power consumption of a storage device 20 is decreased by placing disks 21 with infrequent data access patterns to sleep. Since 80% of data 24 in a storage system is archived, only 20% of the disks 25 will be active. The data access patterns of data on all disks is continuously monitored, and then data is migrated so that the maximum number of disks can be put to sleep to achieve a power savings of approximately 80%.

Figure 10:
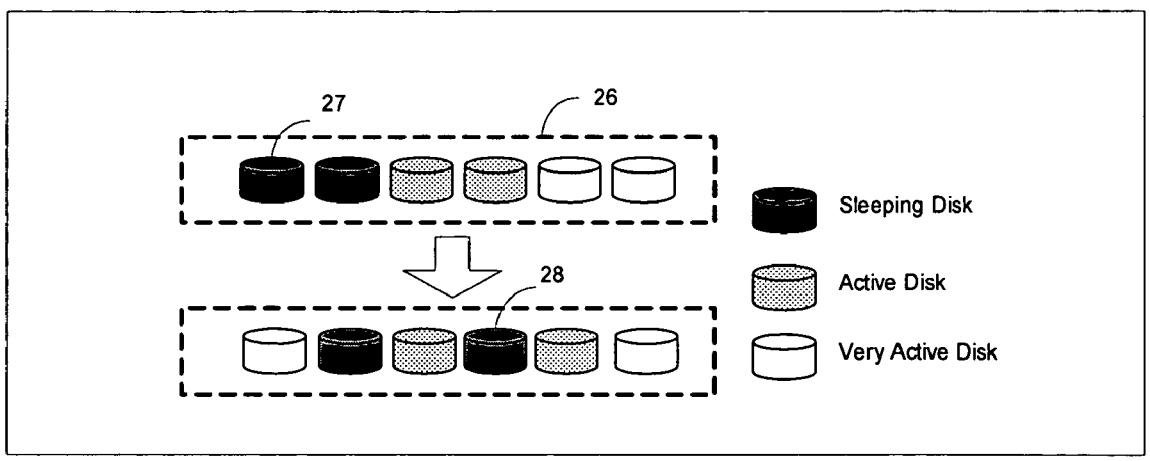

FIG. 10 illustrates an implementation in which the overall heat generated from the storage system is decreased. First, the temperature of all devices 27 in all the disk pools 26 is measured. Next, a temperature distribution within the storage system is measured and computed. Next, a heat distribution plan is generated, in which it is determined which data from one disk 27 should be migrated to another disk 28 so that the heat is evenly distributed throughout the storage system. This prevents hot thermal spots from forming which can raise the operating temperature of the disks and reduce MTBF of a disk or pool of disks.

Figure 11:
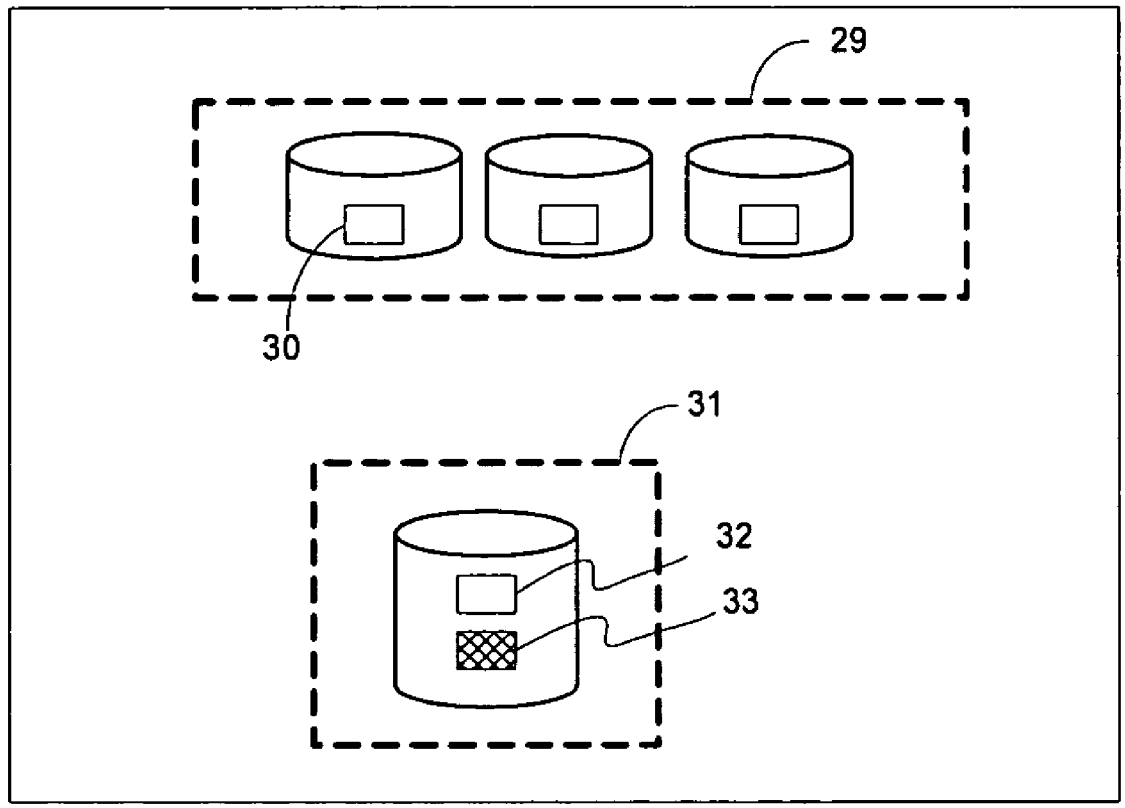

FIG. 11 shows data 30 from a storage system being transferred to a breakaway or removable storage unit 31. The migrated data 33 may be encrypted and/or compressed in the breakaway storage unit 31. All contents of the breakaway storage unit are catalogued into a metadata file 32 so that it is easy to determine what data resides in the breakaway unit 31.

Figure 12:
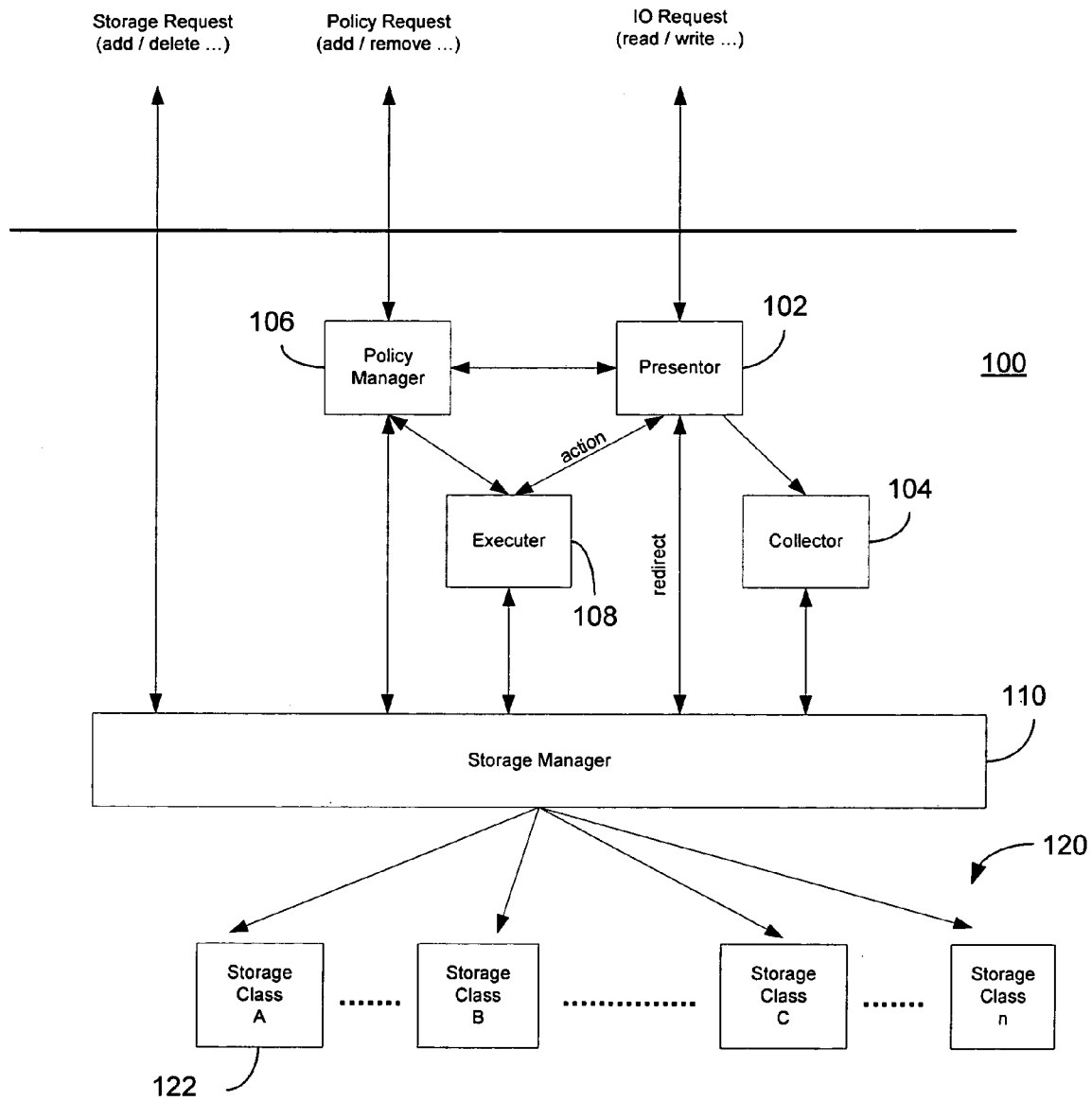
FIG. 12 is a functional block diagram of a system for dynamically managing data on one or more classes of storage having at least one set of two or more disks.

FIG. 12 is a functional block diagram of a disk storage manager 100 for dynamically managing data on one or more classes of storage 120 having at least one set of two or more disks 122. The system 100 includes a presenter 102, a collector 104, a policy manager 106, an executer 108, and a storage manager 110.

The presenter 102 presents a common static namespace to the user. Although the files in the system 100 namespace are dynamically being relocated to a designated storage class, the presenter 102 portrays a stabilized view of the namespace to external systems. The presenter 102 may either immediately redirect I/O to an appropriate device where the actual file resides, or may migrate the file into the namespace.

The collector 104 is configured to gather various statistics on files residing in the presented namespace. Actual capture of statistical data may be performed as I/O requests are passed to the presenter 102, or may be gathered separately by a crawling of the namespace. The policy manager 106 maintains all policies in the disk storage manager 100. The policy manager 106 validates, stores and retrieves policies.

The executer 108 handles several types of actions such as migration, replication, and retention of data, etc. Migration includes moving files in the namespace. The executer 108 communicates with the policy manager 106 to determine a course of action. Once a target storage class 120 is identified for migration, it initiates the migration through a storage manager 110. Replication includes duplicating files between storage classes 120. Retention includes ensuring that a file will remain unmodified in the storage system 100 for a specified period of time. Replication is a policy by which simultaneous copies of data are maintained on numerous storage devices either in the same class or over different classes. In addition to the above mentioned actions, the executer 108 is responsible for other actions.

The storage manager 110 is configured to define storage classes, add and remove devices to storage classes, etc. The storage manager 110 provides access to various sets of devices under its management for actions to be taken by the executer 108, statistical data collection and to service I/O. The storage manager 110 is also responsible for performing any unique management particular to a specific storage class 120.

The functional blocks illustrated in FIG. 12 may be embodied in separate software modules, combined in the same software module, or spread out in a distributed software system hosted on multiple hardware platforms. Embodiments of the disk storage manager and all of the functional operations described in this specification can be implemented in digital electronic circuitry, or in computer software, firmware, or hardware, including the structures disclosed in this specification and their structural equivalents, or in combinations of them.

Embodiments of the invention can be implemented as one or more computer program products, i.e., one or more modules of computer program instructions encoded on a computer readable medium, (e.g., a machine readable storage device, a machine readable storage medium, a memory device), or as a machine-readable propagated signal, for execution by, or to control the operation of, data processing apparatus. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM.

Although a few embodiments have been described in detail above, other modifications are possible. Other embodiments may be within the scope of the following claims.

The invention claimed is:

1. A computer-implemented method of managing storage media, the method comprising:

presenting a common static namespace, the common static namespace providing access to all files in a disk pool via a header corresponding to each file, the disk pool comprising one or more low activity storage disks and one or more high activity storage disks that are strategically distributed through the disk pool to reduce overall ambient temperature of the disk pool and reduce locations of elevated temperature, the one or more low activity storage disks being maintained in a default sleep state and the one or more high activity storage disks being maintained in a default active state, each header retaining a static presented value even as the file to which the header corresponds is moved within the disk pool between the two or more storage disks;

collecting statistics on the files to which access is provided by the common static namespace, the statistics comprising a number of times each file is accessed and the time between each such access, migrating one or more files within the disk pool such that files with lower frequency access statistics are stored on the one or more low activity storage disks and files with higher frequency access statistics are stored on the one or more high activity storage disks, thereby minimizing access times for more active files within the disk pool and maximizing an amount of time that the one or more low activity disks can be left in the sleep state;

analyzing one or more operational parameters of each disk in the disk pool to dynamically calculate when each disk will fail, the operational parameters comprising a frequency with which each disk is awakened from a sleep state; and initiating a migration of all files stored on a failing disk to a more stable disk within the disk pool, the failing disk being predicted to fail within less than an acceptable period of time based on the analysis of the one or more operational parameters.

2. A method in accordance with claim 1, wherein the analyzing one or more operational parameters of each disk further includes:

determining a frequency with which one or more files of the files stored in the disk pool is accessed.

3. A method in accordance with claim 1, wherein each disk in the disk pool is switchable between the sleep state during which data is not being accessed, and the active state during which files are being accessed, and wherein the method further comprises switching at least one disk in the disk pool to the sleep state based on the collected statistics.

4. A method in accordance with claim 1, wherein each disk is switchable between the sleep state during which data is not being accessed, and the active state during which data is being accessed, and wherein the method further comprises switching at least one disk to the active state based on the access pattern.

5. A method in accordance with claim 1, further comprising generating a notification that the failing disk is predicted to fail.

6. A method in accordance with claim 1, further comprising providing a recommendation that the failing disk be replaced after the data have been migrated to the more stable disk.

7. A method in accordance with claim 1, wherein the one or more operational parameters comprise the number of times each disk in the pool is accessed and a time between each access.

8. A method in accordance with claim 1, wherein the one or more operational parameters include a temperature distribution within the disk pool.

9. A method in accordance with claim 1, wherein the analyzing further comprises calculating an estimated mean time between failures for each disk in the pool.

10. A computer readable medium having embodied thereon a computer program configured to cause a processor to implement a storage media management technique, the computer program comprising code segments configured to cause a processor to:

present a common static namespace, the common static namespace providing access to all files in a disk pool via a header corresponding to each file, the disk pool comprising one or more low activity storage disks and one or more high activity storage disks that are strategically distributed through the disk pool to reduce overall ambient temperature of the disk pool and reduce locations of elevated temperature, the one or more low activity storage disks being maintained in a default sleep state and the one or more high activity storage disks being maintained in a default active state, each header retaining a static presented value even as the file to which the header corresponds is moved within the disk pool between the two or more storage disks;

collect statistics on the files to which access is provided by the common static namespace, the statistics comprising a number of times each file is accessed and the time between each such access, migrate one or more files within the disk pool such that files with lower frequency access statistics are stored on the one or more low activity storage disks and files with higher frequency access statistics are stored on the one or more high activity storage disks, thereby minimizing access times for more active files within the disk pool and maximizing an amount of time that the one or more low activity disks can be left in the sleep state;

analyze one or more operational parameters of each disk in the disk pool to dynamically calculate when each disk will fail, the operational parameters comprising a frequency with which each disk is awakened from a sleep state; and initiate a migration of all files stored on a failing disk to a more stable disk within the disk pool, the failing disk being predicted to fail within less than an acceptable period of time based on the analysis of the one or more operational parameters.

11. A computer readable medium in accordance with claim 10, wherein the operational parameters include a number of times within a time frame a unit of data is accessed from at least one disk in the disk pool.

12. A computer readable medium in accordance with claim 10, wherein the operational parameters comprise a temperature distribution within the pool.

13. A method in accordance with claim 10, wherein the dynamical calculating when each disk will fail further comprises calculating an estimated mean time between failures for each disk in the pool.

* * * * *